(12) United States Patent
Nakano et al.

(10) Patent No.: US 8,066,601 B2
(45) Date of Patent: *Nov. 29, 2011

(54) TIMING CHAIN DRIVE SYSTEM

(75) Inventors: Yoshikazu Nakano, Osaka (JP); Shunji Sakura, Osaka (JP); Kohei Kunimatsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/616,342

(22) Filed: Nov. 11, 2009

(65) Prior Publication Data

US 2010/0137085 A1 Jun. 3, 2010

(30) Foreign Application Priority Data

Dec. 2, 2008 (JP) ................................. 2008-307545

(51) Int. Cl.
F16H 55/30 (2006.01)

(52) U.S. Cl. .................... 474/141; 474/160; 474/162

(58) Field of Classification Search .................. 474/141, 474/160, 162
See application file for complete search history.

(56) References Cited

U.S. PATENT DOCUMENTS

| | | | |
|---|---|---|---|
| 7,125,356 B2 | 10/2006 | Todd | |
| 7,691,020 B2 * | 4/2010 | Sakura et al. | 474/156 |
| 2007/0066430 A1 | 3/2007 | Gajewski | |
| 2008/0009377 A1 * | 1/2008 | Sakura et al. | 474/141 |
| 2008/0161144 A1 * | 7/2008 | Hirai et al. | 474/141 |
| 2009/0170648 A1 | 7/2009 | Nakano | |
| 2009/0209380 A1 * | 8/2009 | Hirai et al. | 474/156 |

FOREIGN PATENT DOCUMENTS

JP 2003214504 A 7/2003

* cited by examiner

*Primary Examiner* — Sang Kim

(74) *Attorney, Agent, or Firm* — Howson & Howson LLP

(57) ABSTRACT

In a timing chain driving system in which the speed of a driving sprocket fluctuates cyclically, the tooth pitch of a driven sprocket from which a tension span of the chain travels toward the driving sprocket varies cyclically around the circumference of the driven sprocket so that the tooth pitch at the point at which the timing chain disengages from the driven sprocket is at a minimum when the rotational speed of the driving sprocket is maximum, moderating fluctuations in chain tension. A similar effect can be achieved in the case of a driving sprocket having a cyclically varying tooth pitch by arranging the driving sprocket so that its tooth pitch is maximum at the point at which it is engaged by the chain when its rotational speed is maximum.

2 Claims, 8 Drawing Sheets

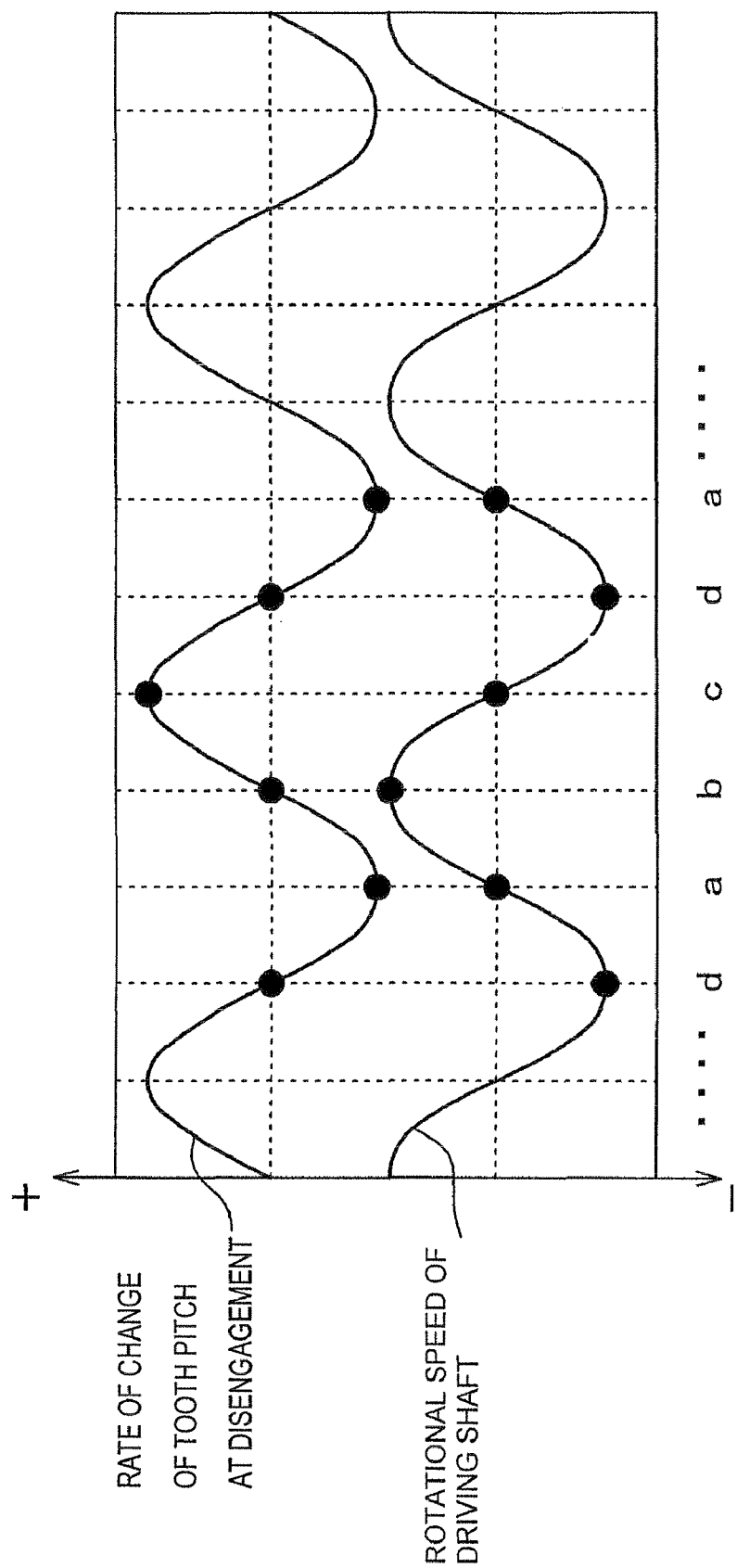

Fig.4B
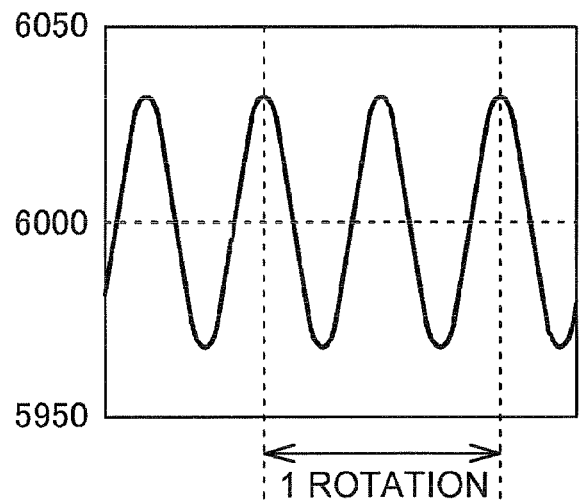
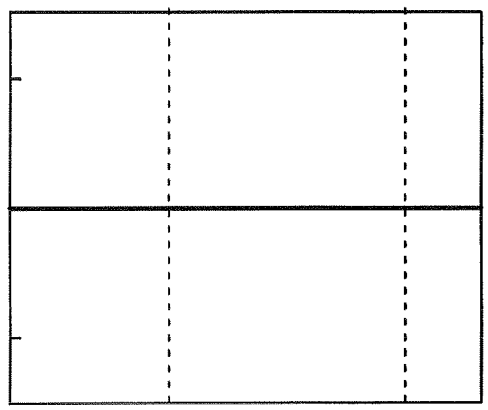
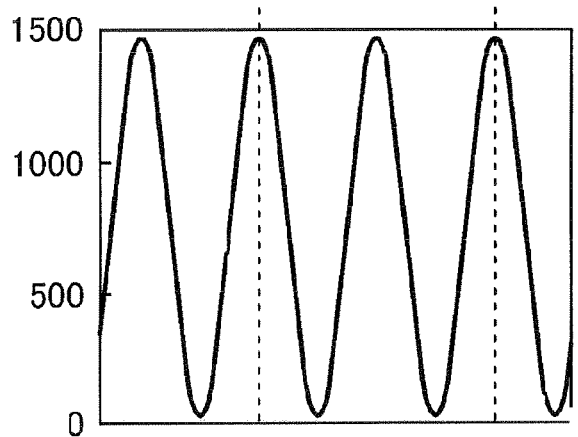

TIMING CHAIN DRIVE SYSTEM

CROSS-REFERENCE TO RELATED APPLICATION

This application claims priority on the basis of Japanese patent application 2008-307545, filed Dec. 2, 2008. The disclosure of Japanese application 2008-307545 is hereby incorporated by reference.

FIELD OF THE INVENTION

This invention relates to a timing chain drive in which a chain is in meshing engagement with driving and driven sprockets for transmitting torque and synchronizing engine camshaft or camshaft sprockets in a predetermined phase relationship with an engine crankshaft sprocket. It relates more specifically to a mechanism for reducing the influence of fluctuations of tension of the timing chain and for reducing vibration and noise.

BACKGROUND OF THE INVENTION

As shown in FIG. 5, a timing chain drive unit 500 in a dual overhead cam (DOHC) internal combustion engine, transmits power by means of a chain CH from a driving sprocket 550 to driven sprockets 560 and 570 which drive camshafts for operate intake and exhaust valves in a cylinder head. A pivoted slack-side chain guide 540, in sliding contact with a part of the chain CH that travels from the driving sprocket 550 to driven sprocket 560, cooperates with a tensioner T to apply appropriate tension to the chain. A pivoted lever of this type is described in Japanese Laid-open Patent Application No. 2003-214504.

A tension-side chain guide 510 is in sliding contact with a portion of the chain that travels from driven sprocket 570 to the driving sprocket to prevent vibration and lateral movement of the chain. Guide 510 controls the length of the span of the chain extending from the point at which the chain disengages the driven sprocket 570 to the point at which the chain engages the driving sprocket 550.

The slack side chain guide 540 is pivotally mounted for oscillating movement on a pivot shaft P, which can be a mounting bolt, a mounting pin, or the like, fixed to, and extending from, a wall of the engine E. The tensioner T biases a shoe on the pivoted slack side chain guide 540 against the chain. Whereas the slack side chain guide 540 is pivoted, the tension-side chain guide 510 is immovably fixed to the engine E by mounting bolts Q or other suitable mounting devices. This arrangement is shown and described in laid-open Japanese Patent Application No. 2003-214504.

In the conventional timing chain drive unit, the operation of the engine valves causes the torque load applied by the camshafts to their sprockets, and through the sprockets to the chain, to change cyclically in synchronization with the rotation of the camshafts and the crankshaft. These cyclic load changes result in corresponding cyclic changes in tension in the tension side of the chain, that is, the span of the chain traveling from the driven sprocket 570 toward the driving sprocket 550.

These cyclic changes in load and in timing chain tension are generated as a result of forces required to open the intake and exhaust valves. In the case of an in-line four cylinder engine, the change in tension goes through four cycles for each rotation of a camshaft. In an in-line six cylinder engine, the change in tension goes through six cycles for each rotation of a camshaft.

Cyclic changes in timing chain tension can also be caused by other factors such as cyclic changes in the rate of rotation of the crankshaft. The timing chain must have a tensile strength capable of withstanding the peak value of the varying chain tension. Accordingly, conventional timing chains are excessively heavy, the overall weight of the drive unit is high, and excessive noise is generated. Thus, the conventional timing chain drive unit is not well adapted to demands for size reduction, weight reduction and noise reduction in internal combustion engines.

Attempts to address the problems caused by cyclic variations in timing chain tension have included the use of non-circular sprockets, and sprockets having tooth gap bottoms located at varying radial distances from the sprocket axis. These approaches are described in United States patent publication 2007/0066430 and in U.S. Pat. No. 7,125,356. However, in the case of a non-circular sprocket or a sprocket having a varying tooth gap bottom radius, a force is applied to the chain in a direction perpendicular to its direction of travel, causing a corresponding displacement of the chain, and generating increased noise due to the vibration of the chain and impact between the chain and its chain guide.

SUMMARY OF THE INVENTION

Objects of this invention include the provision of a timing chain driving system in which the timing chain can be downsized and made lighter in weight, and in which noise produced by the chain driving system is reduced by reducing the influence of fluctuations in chain tension corresponding to the fluctuations in the rotational speed of the driving sprocket.

A timing chain drive system comprises a driving sprocket, typically connected to and driven by an engine crankshaft, a driven sprocket, typically connected to drive an engine valve-operating camshaft, and a timing chain in mesh with both sprockets. The timing chain disengages from the driven sprocket at a disengagement point, and engages with the driving sprocket at an engagement point, and the span of chain traveling from driven sprocket to the driving sprocket is in tension and transmits rotation from the driving sprocket to the driven sprocket at a predetermined speed ratio so that the rotations of the driving and driven sprockets are synchronized in a predetermined relationship.

In an engine timing chain drive system, the speed of the driving sprocket can fluctuate cyclically due to fluctuations in the speed of the engine crankshaft. In the timing chain drive system according to the invention, at least one of the driving and driven sprockets has sprocket teeth the pitch of which cyclically increases and decreases over the circumference thereof. If the pitch of the teeth of the driven sprocket increases and decreases cyclically, the pitch at the disengagement point is smallest when the rotational speed of the driving sprocket is maximum. On the other hand, if the pitch of the teeth of the driving sprocket increases and decreases cyclically, the pitch at the engagement point is greatest when the rotational speed of the driving sprocket is maximum. In the latter case, since the drive ratio of the sprockets is 2:1, the pitch of the driving sprocket will go through two cycles around the perimeter of the driving sprocket.

When the pitches of the sprocket teeth are related to the cyclic fluctuations in the speed of the driving sprocket in this way, the influence of the cyclic fluctuations in the speed of the driving sprocket on tension in the tension span of the timing chain is reduced. Therefore, it is possible to utilize the cyclically varying tooth pitch to absorb changes in chain tension that would otherwise result from fluctuation in the load on the driven sprocket or from fluctuations in the rotational speed of the driving sprocket, and to do so without applying forces tending to displace the chain in a direction other than the direction of chain travel. Thus, the chain can be downsized and made lighter in weight, noise and vibration can be reduced, and the structure of the chain driving system can be simplified by having fewer movable parts.

In an engine timing drive, the invention allows for efficient reduction of the influence on chain tension by fluctuations in crankshaft rotational speed or load fluctuations in the camshaft. Thus, vibrations and the overall noise level produced by the timing drive in the engine can be reduced, and, at the same time, the timing drive can be downsized, made lighter in weight, and simplified by reducing the number of moving parts.

Consequently, the entire engine can be reduced in size and made lighter in weight.

BRIEF DESCRIPTION OF DRAWINGS

FIG. 3 is a graph showing the relationship between the rate of change of the rate of arrival of the teeth of the driven sprocket at a disengagement point K, and the rotational speed of a driving sprocket during the operations shown in FIGS. 2A-2D.

FIGS. 4A through 4C are graphs comparing the results of experiments carried out on the timing chain driving system according to the embodiment of the invention shown in FIG. 1 and on a timing chain driving system according to the prior art.

DETAILED DESCRIPTION OF THE PREFERRED EMBODIMENTS

The timing chain driving system of the invention can take any form, provided that at least one of its sprockets has sprocket teeth the pitch of which cyclically increases and decreases over its circumference and which is synchronized with cyclic variations in the speed of the driving sprocket.

At least one of the driving and driven sprockets has sprocket teeth the pitch of which cyclically increases and decreases over the circumference thereof. If the pitch of the teeth of the driven sprocket increases and decreases cyclically, the pitch at the point at which the timing chain disengages from the driven sprocket is smallest when the rotational speed of the driving sprocket is maximum. On the other hand, if the pitch of the teeth of the driving sprocket increases and decreases cyclically, the pitch at the point at which the timing chain engages the driving sprocket is greatest when the rotational speed of the driving sprocket is maximum.

The chain driving system absorbs changes in chain tension resulting from the fluctuation of rotational speed without the need to apply force to the chain by means of a tensioner or the like in a direction other than the direction of chain travel. The system permits downsizing and weight reduction, structural simplification by the reduction of the number movable parts, and reduces vibration and noise.

Figure 5:
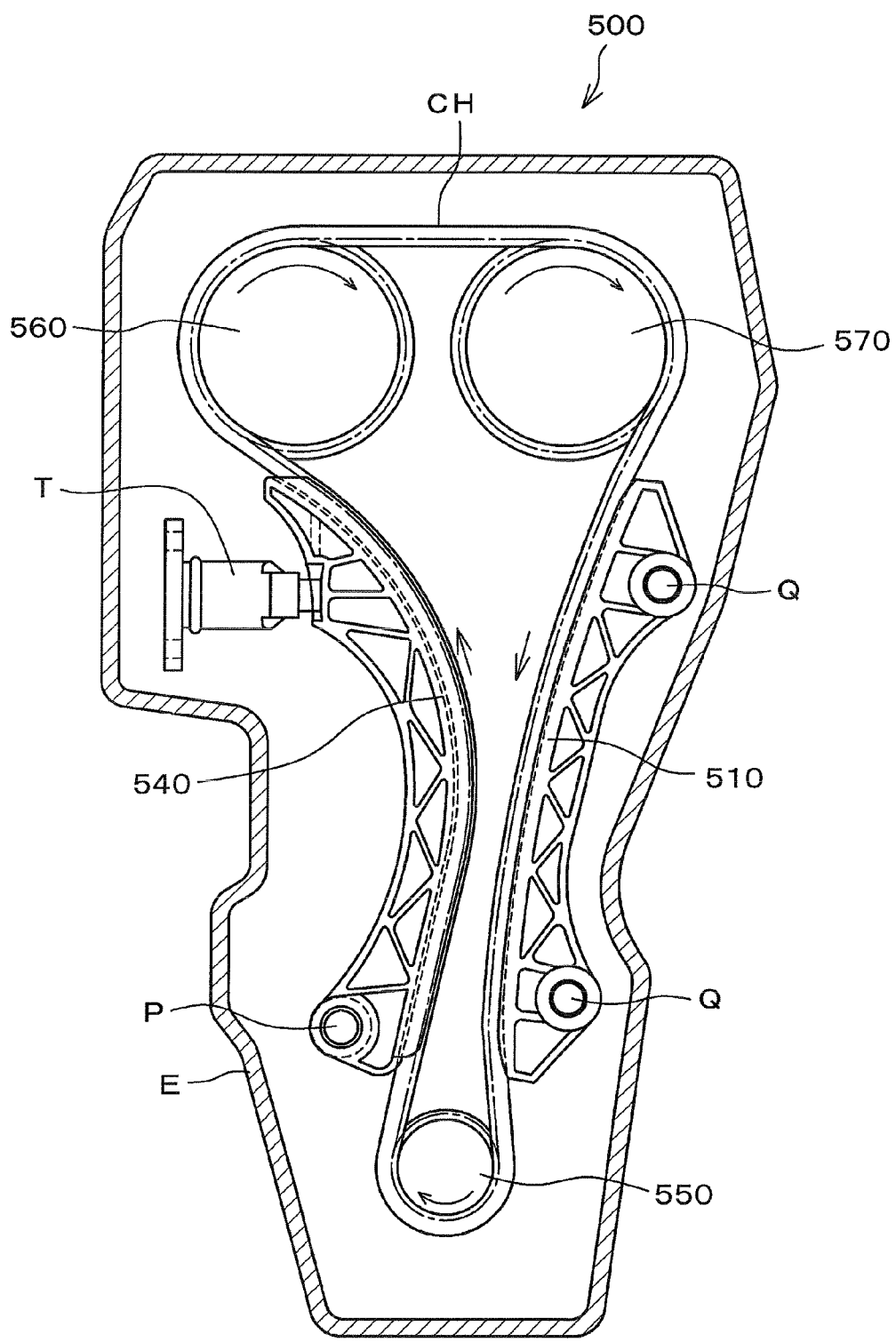
FIG. 5 is a schematic view of a chain timing driving system.

The timing chain driving system according to one embodiment of the invention is applied to an in-line four-cylinder DOHC engine. In this case, the rotational speed of the driving sprocket, i.e., the crankshaft sprocket, fluctuates at a rate of two cycles for one full rotation of the driving sprocket. Since the camshaft sprocket rotates at one-half the speed of the crankshaft sprocket, the rotational speed of the crankshaft sprocket, and of the camshaft sprocket, fluctuates at a rate of four cycles for each full rotation of the camshaft sprocket. The structure of the chain driving system, except for the cyclic pitch variation of sprocket teeth, is the same as in the prior art engine timing drive shown in FIG. 5.

Figure 1:
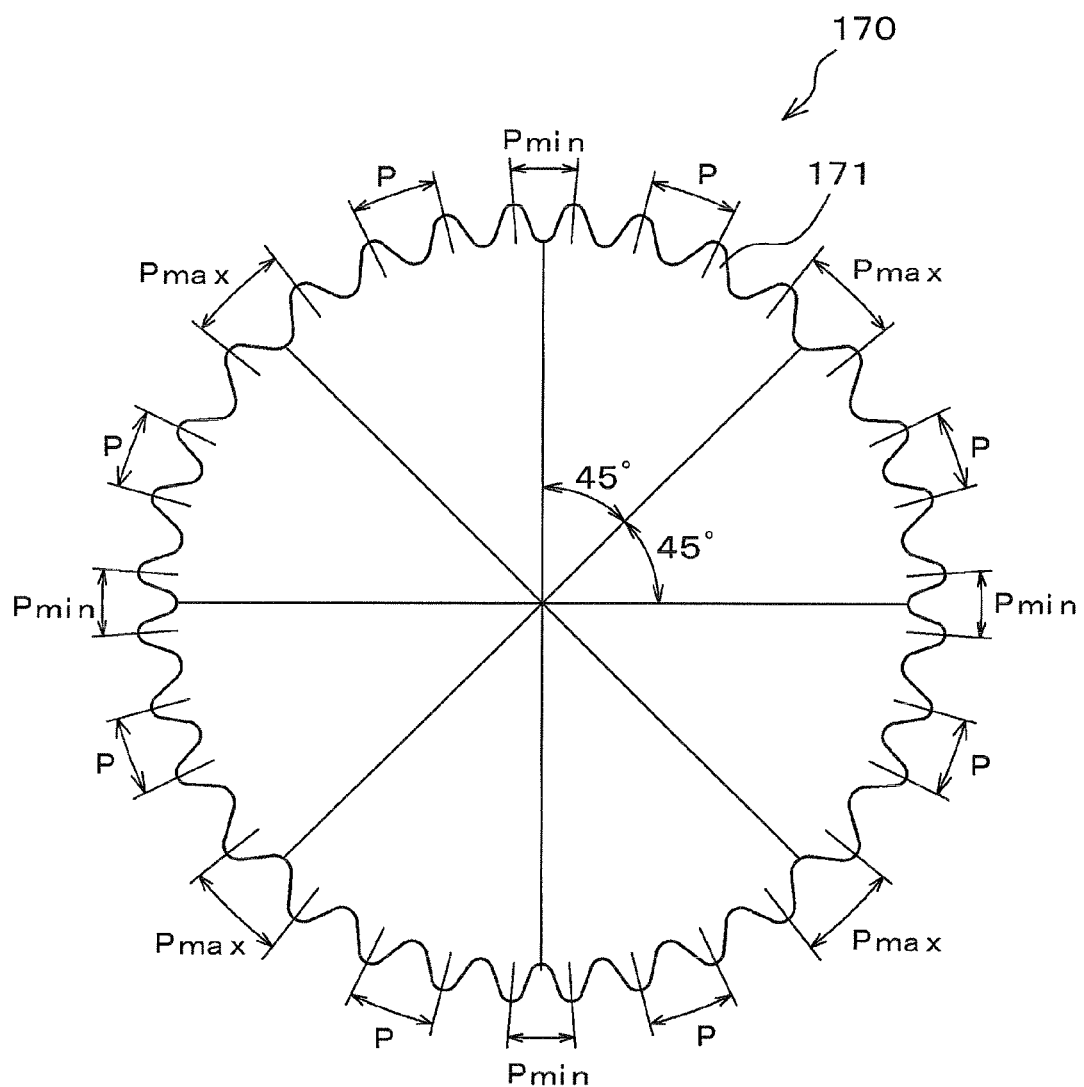
FIG. 1 is a schematic elevational view of a sprocket for a timing chain drive system according to one embodiment of the invention.

The sprocket 170 in FIG. 1 is a driven sprocket 170 (corresponding to sprocket 570 in FIG. 5) on the tension side of the chain CH. The positions of its sprocket teeth 171 vary cyclically in a pattern that is repeated through four cycles, which corresponds to the fluctuation of rotational speed by four cycles in one rotation. That is, the pitch of the sprocket teeth 171 increases and decreases cyclically so that locations Pmax, where the pitch is widest, and locations Pmin, where the pitch is narrowest, alternate at intervals of 45 degrees as shown in FIG. 1. As a result, when the driven sprocket 170 rotates, the rate of arrival of sprocket teeth at the point at which the chain CH disengages from the sprocket is cyclically advanced and retarded, effectively changing the slack or the tension in the span of chain_traveling from the driven sprocket toward the driving sprocket.

The pitch variations are exaggerated in FIG. 1 for the purpose of illustration. However, the actual variations from the mean pitch value will be only about 0.2 mm in an ordinary in-line, four-cylinder DOHC engine in which the length of the tension span of the timing chain CH is around 300 mm. These small pitch variations compensate for the cyclic variations in the load on the driven sprocket or in the rotational speed of the driving sprocket, but are so small that they do not affect the engagement of the chain CH with the sprockets.

As shown in FIGS. 2A through 2D, the chain CH is in mesh with a tension-side driven sprocket 170, which rotates clockwise. The chain CH disengages from the sprocket 170 at a disengagement point K.

In the figures, the locations of the maximum pitch, Pmax, are schematically indicated by white sections and the locations of the minimum pitch, Pmin, are indicated by black sections. The pitch value changes sinusoidally in the preferred embodiment. Whereas, in a conventional timing chain drive, the teeth of a driven sprocket pass through the disengagement point at a uniform rate, in the timing chain drive according to the invention, the timing of passage of a tooth through the disengagement point K is cyclically advanced and retarded because of the cyclically varying tooth pitch.

Figure 2A:
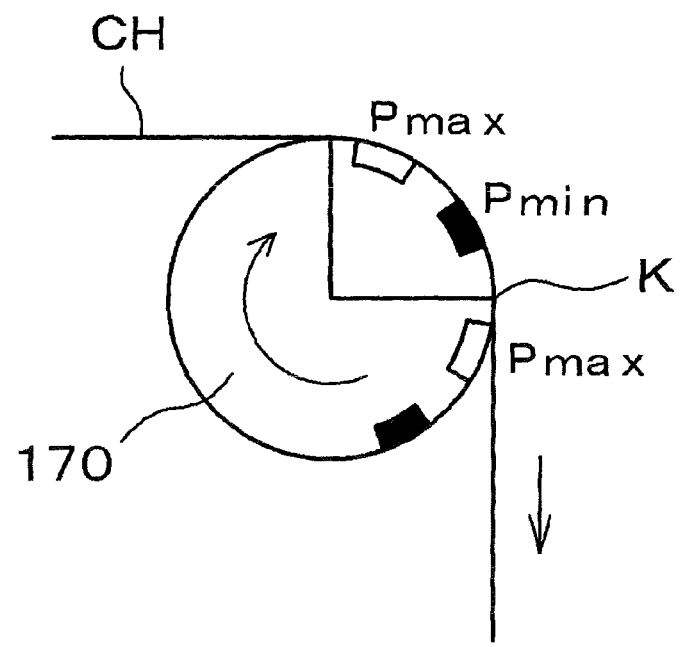
FIGS. 2A through 2D are diagrams explaining the operation of the timing chain driving system according to the embodiment of the invention shown in FIG. 1.

In FIG. 2A, a point Pmax on the sprocket has passed through the disengagement point K, and the following point Pmin is approaching the disengagement point. At the disengagement point, therefore, the tooth pitch is decreasing from the condition illustrated in FIG. 2D, where the tooth pitch at the disengagement point is maximum. In FIG. 2A, the pitch of the sprocket teeth at the disengagement point K corresponds approximately to the standard, uniform, tooth pitch, since the teeth having a wider pitch than the standard pitch have passed through the disengagement point. At this time, the tooth pitch at the disengagement point K is decreasing at its maximum rate, and therefore the rate at which the sprocket teeth arrive at point K is increasing.

Figure 2B:
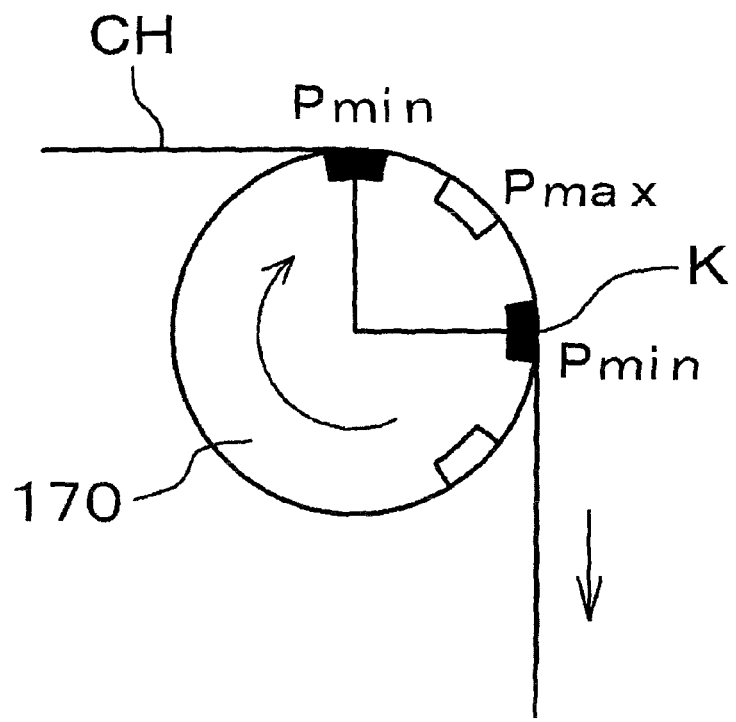

In FIG. 2B, a minimum pitch location, Pmin, is at the disengagement point K, the rate of change of tooth pitch at the disengagement point K is zero, and the sprocket teeth arrive at the disengagement point at a maximum rate.

Figure 2C:
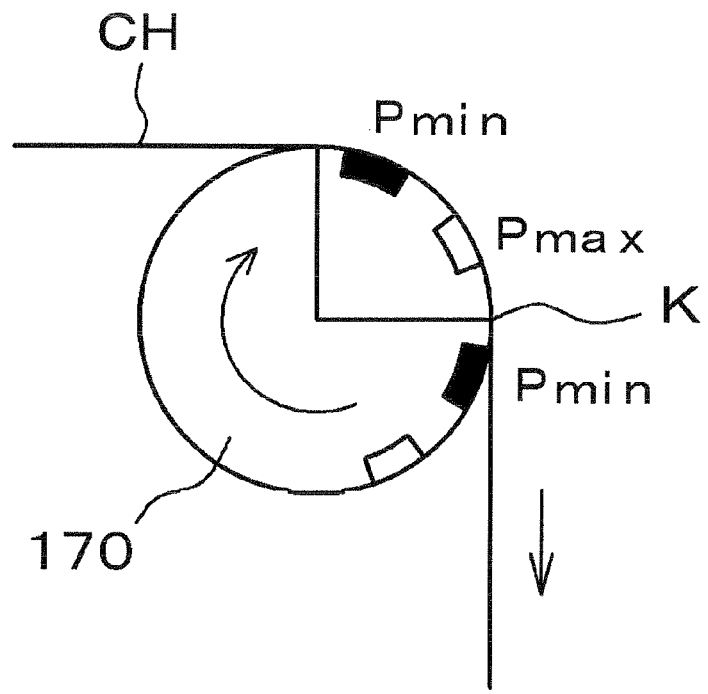

In FIG. 2C, a point Pmin on the sprocket has passed through the disengagement point K, and the following point Pmax is approaching the disengagement point. At the disengagement point, therefore, the tooth pitch is increasing from the condition illustrated in FIG. 2B at a maximum rate. In FIG. 2C, the pitch of the sprocket teeth at the disengagement point K again corresponds approximately to the standard tooth pitch, since the teeth having a pitch narrower than the standard pitch have passed through the disengagement point. Here, the rate of arrival of teeth at point K is increasing.

Figure 2D:
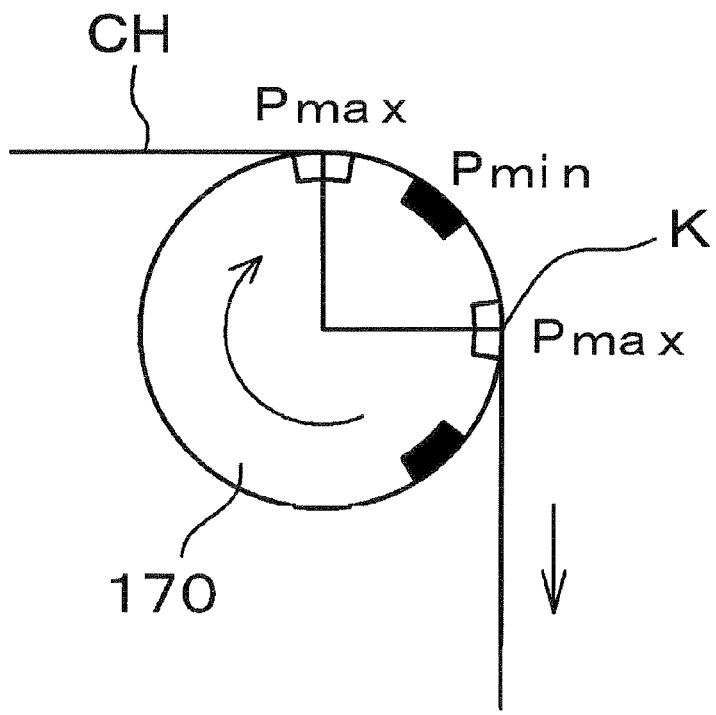

In FIG. 2D, the tooth pitch at the disengagement point K is at a maximum, the rate of change of tooth pitch at point K is zero, and the rate of arrival of teeth at point K is at a minimum.

As the chain drive system operates, the stages depicted in FIGS. 2A through 2D are repeated, the rate of arrival of teeth at the disengagement point K advances and retards cyclically. The cyclic change in the rate of arrival of sprocket teeth at point K tends to change the tension in the span of chain traveling from the driven sprocket 170 toward the driving sprocket, compensating for changes in tension caused by cyclic changes in the rotational speed of the driving sprocket or by cyclic changes in the load on the driven sprocket.

FIG. 3 shows the relationship between the rate of change in the rate of arrival of sprocket teeth at the point of disengagement of the chain from the driven sprocket and the fluctuations of the rotational speed of the driving sprocket. Points a through d in FIG. 3 correspond to the stages shown in FIGS. 2A through 2D, respectively.

At point a, the rate of arrival of teeth at the disengagement point K is increasing at a maximum rate, and this is why the upper graph in FIG. 3 is farthest below the reference line at point a. At the same time, the rotational speed of the driving shaft is increasing.

The increasing rate of arrival of teeth at the disengagement point K tends to decrease the tension in the chain, thereby compensating for increasing tension caused by the increasing rate of rotation of the driving sprocket.

At point b, a Pmin point on the sprocket is at the disengagement point K, the rate of arrival of sprocket teeth at point K is at a maximum, and the change in the rate of arrival of teeth at point K is zero. Point b coincides in time with the point at which the rotational speed of the driving sprocket is at a maximum. The reduction in tension in the tension span of the chain CH resulting from the higher rate at which sprocket teeth arrive at the disengagement point K continues to compensate for increased tension caused by the high rate of rotation of the driving sprocket.

At point c, the rate of arrival of teeth at the disengagement point K is decreasing at a maximum rate, and this is why the upper graph in FIG. 3 is farthest above the reference line at point c. At the same time, the rotational speed of the driving shaft is decreasing. The decrease in the rate of arrival of teeth at the disengagement point tends to increase tension in the tension span of the chain, thereby compensating for the decrease in tension resulting from the decrease in the rotational speed of the driving sprocket.

At point d, a Pmax position on the sprocket is at the disengagement point K. The rate of arrival of teeth at the disengagement point is at a minimum, and the rate of change in the rate of arrival of teeth at the disengagement point is zero. The point at which the rotational speed of the driving sprocket is lowest coincides with this point d.

It will be seen that the rate of arrival of teeth at the disengagement point on the driven sprocket is lowest when the rotational speed of the driving sprocket is at a minimum, and the rate of arrival of teeth at the disengagement point on the driven sprocket is highest when the rotational speed of the driving sprocket is at a maximum. By synchronizing the phase of the sprocket teeth 171 with the fluctuations in the rotational speed in an optimum phase relationship as described above, it is possible to absorb fluctuations in rotational speed effectively without displacement or application of force in a direction other than the direction of chain travel. An advantage of this arrangement is that, by reducing the maximum tension applied to the chain, the chain can be downsized and made lighter in weight. As a result, the overall chain driving system can be downsized, made lighter in weight, and simplified by reducing the number of moving parts. At the same time, noise caused by vibration of the chain can be reduced.

Figure 4A:
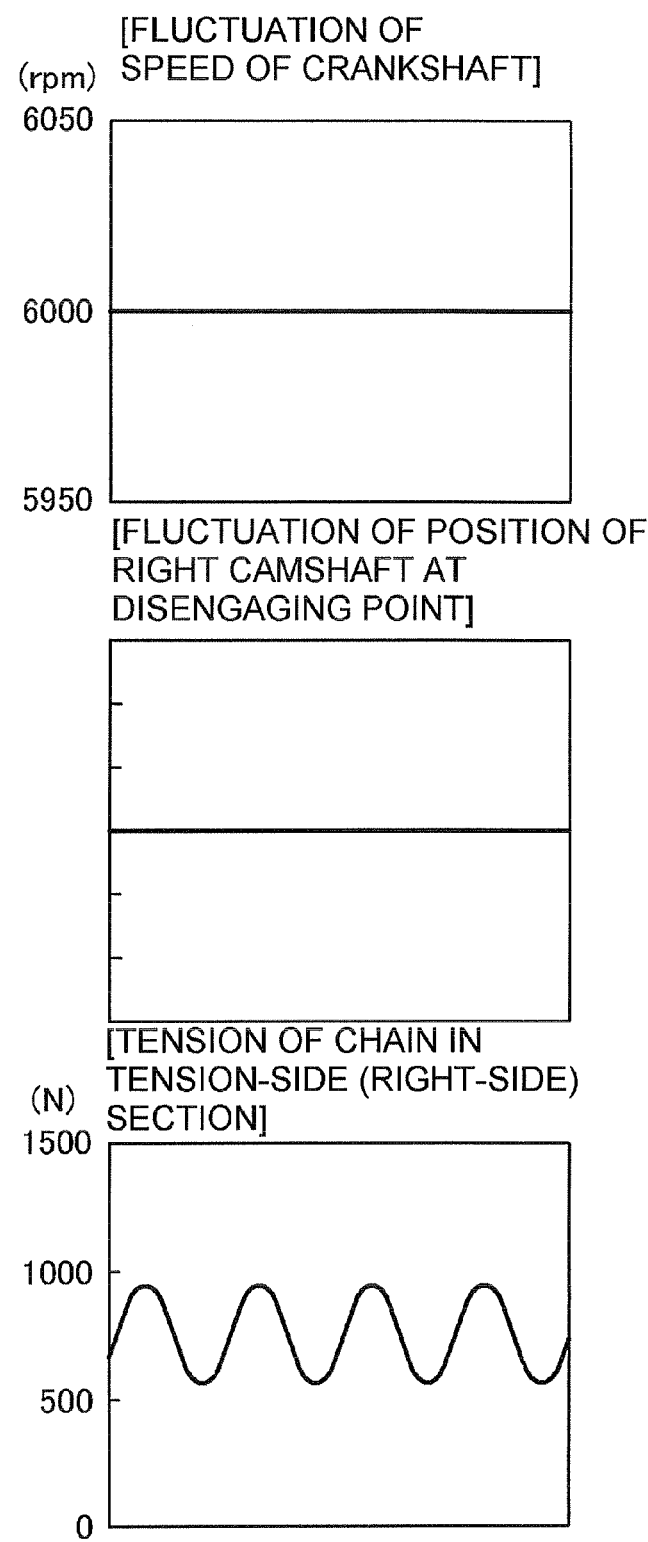
Figure 4C:
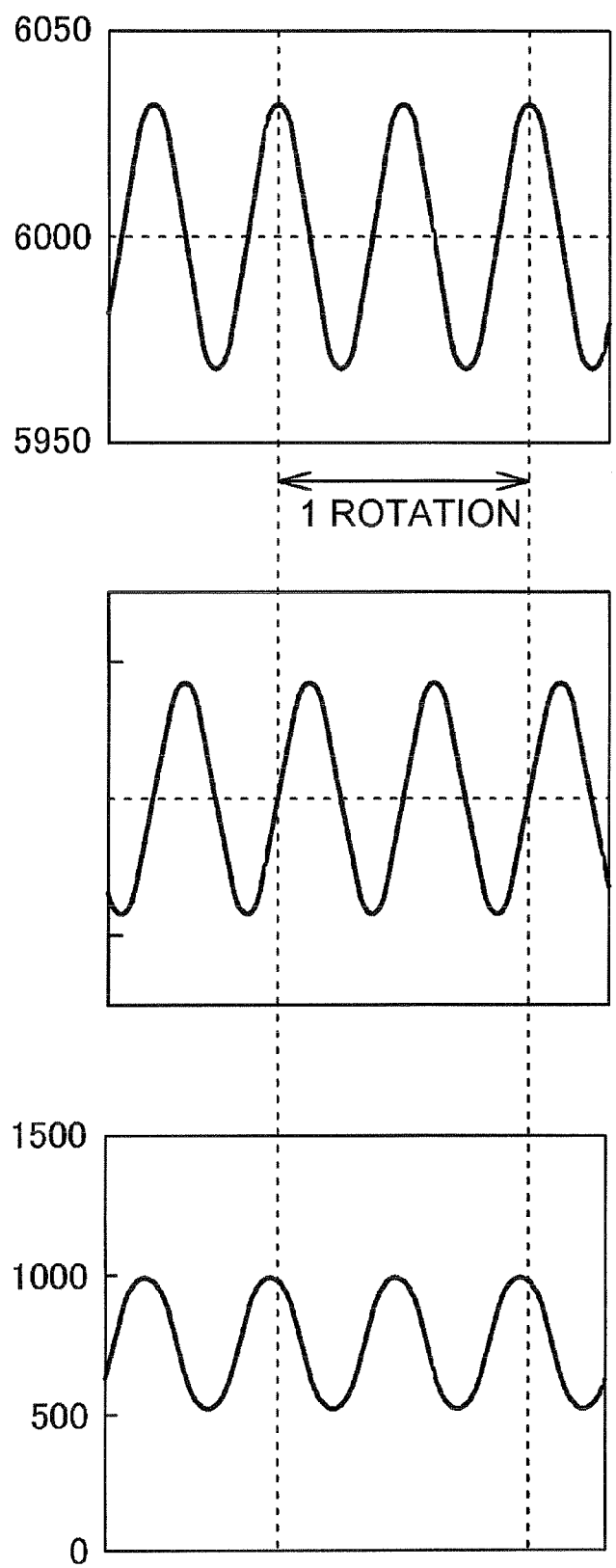

FIGS. 4A and 4B are graphs showing the results of measurements of peak tension carried out on an in-line four-cylinder engine using a standard driven sprocket, and FIG. 4C is a similar graph showing results of measurements of peak tension carried out on the same engine using a driven sprocket according to the invention in which the tooth pitch cyclically increases and decreases.

In FIG. 4A, the crankshaft causes no fluctuation of rotational speed. The tension in the chain fluctuates slightly due to load fluctuations, resulting from operation of the engine camshaft.

In FIG. 4B, the crankshaft rotational speed fluctuates, and a large fluctuation in chain tension is generated in synchronism with the fluctuations in rotational speed.

In FIG. 4C the crankshaft rotational speed fluctuates as in FIG. 4B, but tooth pitch of the driven sprocket cyclically increases and decreases in accordance with the invention. Most of the fluctuation in tension associated with the fluctuation in rotational speed of the crankshaft sprocket is absorbed by setting the driven sprocket so that the pitch of its teeth at the disengagement point is minimized at the rotational angles at which the rotational speed of the driving sprocket is maximum. The remaining, relatively minor, fluctuations in tension, caused by load fluctuations, are similar to those shown in FIG. 4A.

In the example illustrated in FIG. 4C, the crankshaft is set to rotate at 6,000 rpm. The rotational speeds at which the tension moderating effect of the invention is greatest vary depending on conditions such as type and size of the engine and the size and disposition of other structural elements. The chain driving system exhibits the greatest tension moderating effect at high rotational speeds. At lower rotational speeds fluctuations in chain tension are absorbed by other tension absorbing elements.

Although in the example described, the advancement and retardation of the arrival of sprocket teeth at the disengagement point and the cyclic fluctuations in the rotational speed of the driving sprocket follow sinusoidal curves, the curve representing the rate of change in the rate of arrival of sprocket teeth at the disengagement point can be appropriately set so that, even if the actual fluctuation in the rotational speed of the driving sprocket is not sinusoidal, the rate of arrival of driven sprocket teeth at the disengagement point K is greatest when the rotational speed of the driving sprocket is at its maximum value and the rate of arrival of driven sprocket teeth at the disengagement point is lowest when the rotational speed of the sprocket is at its minimum value.

Although the sprocket in which the tooth pitch cyclically increases and decreases is the driven sprocket in the embodiment described, as an alternative, the driving sprocket can have a cyclically increasing and decreasing tooth pitch, and as a further alterative, both the driving sprocket and the driven sprocket can have a cyclically increasing and decreasing tooth pitch.

When the driving sprocket has a cyclically increasing and decreasing tooth pitch, the tension span of the chain advances toward the driving sprocket, and the relationship of the phase of the tooth pitch at the engagement point on the driving sprocket to the rotational speed of the driving sprocket is the reverse of the corresponding relationship in the driven sprocket. That is, at a maximum driving sprocket rotational speed, a Pmax point on the driving sprocket should be at the engagement point. Similarly, in the case in which both sprockets have a cyclically varying pitch, when a Pmin point on the driven sprocket is at the disengagement point K, a Pmax point on the driving sprocket should be at the engagement point.

The use of a cyclically varying tooth pitch also makes it possible to prevent various vibrations and noises associated with vibrational resonance and sonic resonance other than cyclic fluctuations in rotational speed.

The invention claimed is:

1. A timing chain drive system comprising a driving sprocket, a driven sprocket, and a timing chain in mesh with both sprockets and having a span traveling from the driven sprocket to the driving sprocket, said span being in tension and transmitting rotation from the driving sprocket to the driven sprocket at a predetermined speed ratio so that the rotations of the driving and driven sprockets are synchronized in a predetermined relationship;

wherein the speed of said driving sprocket fluctuates cyclically;

wherein at least one of said sprockets has sprocket teeth the pitch of which cyclically increases and decreases over the circumference thereof;

wherein the timing chain disengages from the driven sprocket at a disengagement point, and engages with the driving sprocket at an engagement point;

wherein, if the pitch of the teeth of the driven sprocket increases and decreases cyclically, the pitch of the teeth of the driven sprocket at the disengagement point is smallest when the rotational speed of the driving sprocket is maximum; and wherein, if the pitch of the teeth of the driving sprocket increases and decreases cyclically, the pitch of the teeth of the driving sprocket at the engagement point is greatest when the rotational speed of the driving sprocket is maximum;

whereby the influence of the cyclic fluctuations in the speed of the driving sprocket on tension in said span of the timing chain is reduced.

2. The timing chain driving system according to claim 1, in which the driving sprocket is driven by an engine crankshaft, the driven sprocket drives an engine camshaft, and the fluctuations in the rotational speed of the driving sprocket are caused by fluctuations in the rotational speed of the crankshaft.

* * * * *